July 23, 1946.  H. G. MOSHER  2,404,520
MOUNTING DEVICE FOR DUAL WHEELS
Filed May 21, 1945
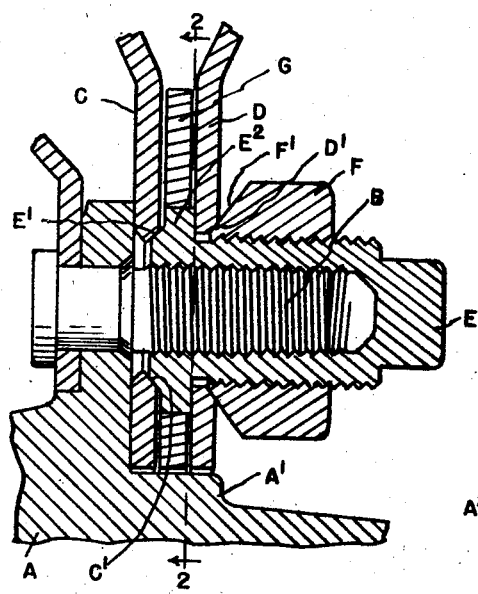
FIG.1.
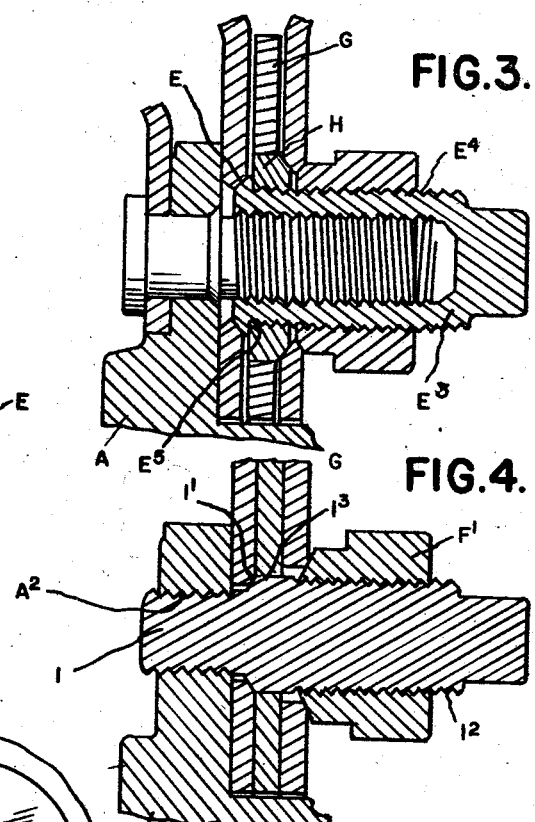
FIG.3.
FIG.4.
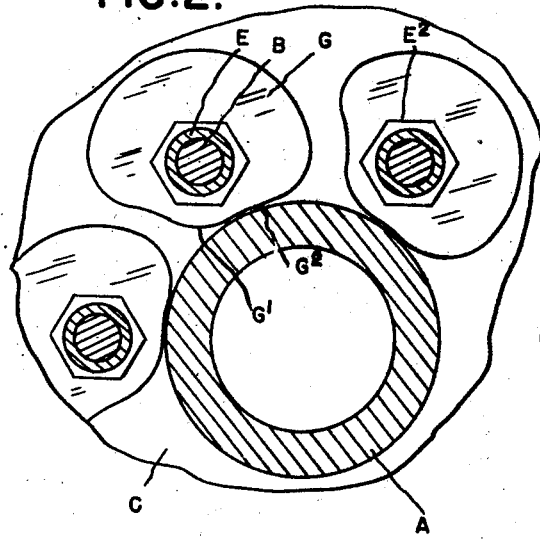
FIG.2.
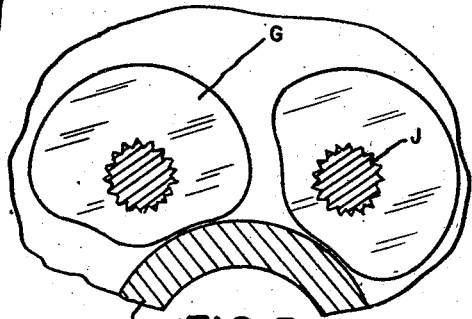
FIG.5.
INVENTOR.
HARVEY G. MOSHER
BY
Whittemore Hulbert + Belknap
ATTORNEYS Patented July 23, 1946

2,404,520

UNITED STATES PATENT OFFICE 2,404,520

MOUNTING DEVICE FOR DUAL WHEELS

Harvey G. Mosher, Inkster, Mich.

Application May 21, 1945, Serial No. 594,941

4 Claims. (Cl. 301—36)

The invention relates to mounting means for dual vehicle wheels and more particularly to that type in which the two wheels are independently positioned and clamped by a series of separately operable but axially aligned threaded clamping members. With such constructions the inner wheel is first positioned and clamped upon the hub by the threaded clamping members therefor after which the outer wheel is positioned and clamped by the second clamping members which threadedly engage the first clamping members. Thus, if the first clamping members for the inner wheels are nuts engaging threaded studs projecting from the wheel hub, the second clamping members are larger nuts threadedly engaging the exterior of the stud engaging nuts. On the other hand, if the clamping means for the inner wheel is a tap screw engaging a threaded aperture in the hub, the clamping means for the second wheel will be a nut threadedly engaging the exterior of said tap screw. It has been found that it is difficult to unclamp the outer wheel without also disturbing the clamping means for the inner wheel. This is for the reason that the threads of the outer clamping member are of greater radius than those for the inner clamping member and, consequently, the effective frictional resistance to the turning of the outer member on the inner member is greater than the resistance to turning of the inner member on its threaded bearing. As a result, the unscrewing of the outer member carries the inner member with it so that both wheels are simultaneously unclamped.

It is the object of the invention to provide means for preventing the loosening of the clamping means for the inner wheel during the unscrewing of the clamping means for the outer wheel. To this end the invention consists in the construction as hereinafter set forth.

In the drawing:

Fig. 1 is a sectional elevation showing a portion of the hub and one of the studs of a dual wheel mounting to which my improvement is applied;

Fig. 2 is a section on line 2—2, Fig. 1;

Fig. 3 is a view similar to Fig. 1 showing a slightly modified construction;

Fig. 4 is a similar view of another modification;

Fig. 5 is a view similar to Fig. 2 of another modification.

As shown in Fig. 1, A is a portion of a vehicle wheel hub and B is one of the threaded studs projecting outward therefrom. C is the inner wheel and D the outer wheel, both being apertured to receive the stud B. The inner wheel C is clamped by a member E which is internally threaded to engage the stud B and has its inner end a conical portion $E'$ for engaging a conical bearing $C'$ surrounding the aperture in the wheel C. The member E is also externally threaded for engagement of a clamping nut F which latter is provided with a conical inner end portion $F'$ for engaging a conical bearing $D'$ on the wheel D.

The construction as thus far described has been heretofore used and is objectionable for the reasons above given. Thus, if it is desired to remove the outer wheel D, the attempt to unscrew the nut F will result in also unscrewing the member E thereby loosening both wheels. To avoid such result, I have devised the construction shown in Figs. 1 and 2 in which G is a disc member detachably and non-rotatably engageable with the clamping member E. As specifically shown in Fig. 2, the member E has a polygonal portion $E^2$ between the wheels C and D and the disc G is provided with a correspondingly shaped aperture therein. Thus, after the inner wheel C has been clamped by the screwing of the members E upon the studs B, the member G is engaged with the polygonal portion $E^2$. As usually constructed, the hub A has a projecting flange portion $A'$ on which the wheels C and D are piloted when engaged with the studs B. To avoid interference with the flange $A'$ during engagement of the disc G with the portion $E^2$, the outer periphery of the disc has a small radius portion $G'$ which clears the flange $A'$ and also a large radius portion $G^2$ which lies adjacent to said flange. Thus, any rotation of the member E on the stud B will be prevented by the member G. This member does not interfere with the mounting of the wheel D or the clamping by the nut F. However, if the nut F is unscrewed to release the wheel D, this cannot rotate the member E on the stud B. On the other hand, if after removing the wheel D the wheel C is also to be released, then the member G may be easily disengaged from the portion $E^2$ of the member E after which the latter member may be turned to unscrew it from the stud D.

As above described, the dual wheel mounting without the polygonal portion $E^2$ on the clamping member E has heretofore been manufactured and used. In order to provide such construction with my improvement, I have devised the construction illustrated in Fig. 3. In this a member $E^3$ is similar to the member E but without the polygonal portion $E^2$. H is a nut engageable with the exterior threads $E^4$ and which is screwed thereon against the shoulder $E^5$ of the portion forming the conical bearing $E'$. The exterior of the member H is either polygonal or otherwise fashioned to form a non-rotative engagement with the disc G and the construction is otherwise the same as above described.

With the modification shown in Fig. 4, in place of using a nut E engaging the stud B for clamping the inner wheel, a tap screw I engages a threaded socket $A^2$ in the hub and is provided with a conical portion $I'$ for clamping the wheel. The member I is also externally threaded at $I^2$ for receiving the nut $F'$ similar to the nut F and between this threaded portion and the portion $I'$ is a polygonal portion $I^3$ for engaging the member G.

In Fig. 5 is shown a construction where the portion which is engaged by the disc member G has a serrated periphery J for engagement with a similarly formed aperture in the member G. With all the various modifications, the same result is obtained, viz., the clamping member for the inner wheel may be freely turned into clamping engagement therewith after which the member G is placed in position and will hold said clamping member against rotation.

What I claim as my invention is:

1. In a mounting for dual vehicle wheels, the combination with a hub, a clamping member having a threaded engagement with said hub for securing the inner wheel thereto and a second clamping member coaxial and having a threaded engagement with said first mentioned clamping member for securing the outer wheel to said hub; of a member detachably and non-rotatably engageable with said first mentioned clamping member and having a bearing against a portion of said hub for locking said first clamping member against rotation during the mounting and demounting of said outer wheel.

2. In a mounting for dual vehicle wheels, the combination with a hub, a clamping member having a threaded engagement with said hub for securing the inner wheel thereto and a second clamping member coaxial and having a threaded engagement with said first mentioned clamping member for securing the outer wheel to said hub; of means for locking said first mentioned clamping member against rotation comprising a member axially and non-rotatably engageable therewith in a plane between said wheel members and having an eccentric portion bearing against a portion of said hub.

3. In a mounting for dual vehicle wheels, the combination with a hub, a clamping member having a threaded engagement with said hub for securing the inner wheel thereto and a second clamping member coaxial and having a threaded engagement with said first mentioned clamping member for securing the outer wheel to said hub; of means for locking said first mentioned clamping member from rotation comprising a polygonal bearing thereon in a plane between said wheels and a disc member apertured to be axially engageable with said polygonal bearing and having an eccentric portion for engaging a bearing on said hub.

4. In a mounting for dual vehicle wheels, the combination with a hub having a stud projecting therefrom, a member internally threaded to engage said stud having an inner end portion for engaging the inner wheel to clamp the same to said hub and also being externally threaded and a second member engaging the external threads of said first clamping member for clamping said second wheel to said hub; of a member engaging the external threads of said first clamping member and bearing against the inner end portion thereof in a plane between said wheels and having a polygonal contour and a disc member apertured to axially engage and to fit the polygonal contour of the last mentioned member and also having bearing on a portion of said hub serving to lock said first clamping member from rotation during rotation of said second clamping member in the mounting and demounting of the outer wheel.

HARVEY G. MOSHER.